Aug. 29, 1933.    W. CLAUS ET AL    1,924,483
METHOD OF AND MEANS FOR SEPARATING CELLULOSE
OR THE LIKE FROM TREATING LIQUID
Filed Jan. 21, 1931
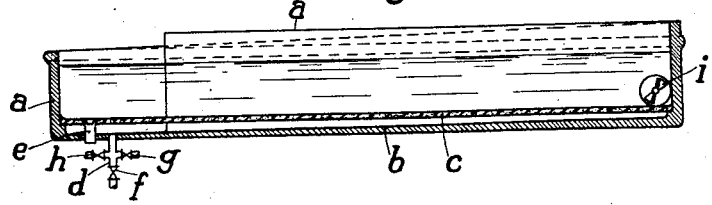
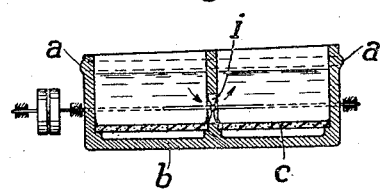
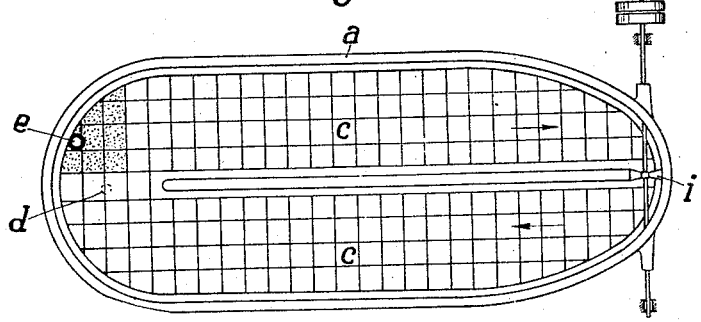
Inventors
Walter Claus
and Erwin Schmidt
By Alfred Lewis
Atty.

Patented Aug. 29, 1933

1,924,483

UNITED STATES PATENT OFFICE 1,924,483

METHOD OF AND MEANS FOR SEPARATING CELLULOSE OR THE LIKE FROM TREATING LIQUID

Walter Claus and Erwin Schmidt, Mannheim-Waldhof, Germany, assignors to Zellstofffabrik Waldhof, Mannheim-Waldhof, Germany, a company of Germany Application January 21, 1931, Serial No. 510,311, and in Germany March 19, 1930

5 Claims. (Cl. 92—29)

Heretofore, in the bleaching, washing or other treatment of cellulose, mechanical wood pulp, etc., in order to separate the liquid employed for treatment from the fibrous mass, use has been made either of revolving screens (washing drums, bucket drums) or perforated bottoms (filtering bottoms) or the so-called suction cell filters.

In the first case, the liquid passes through a fine wire sieve, with which the cylindrical drum dipping into the pulp is covered, and on the rotation of the drum, is emptied by the scoops of the same into the discharge trough. This method of separating cellulose and liquid used for treatment has great disadvantages. The scooping out of the liquid by the revolving drum only proceeds very slowly. As the drum dips into the mass of pulp at a certain place only and to a certain depth only, the separation in the first place is not very uniform, even when the pulp is in motion, and portions of the pulp remain in contact much longer and with larger quantities of the liquid used for treatment than do the other portions. The metal sieves employed for covering the drums are, in certain circumstances, perceptibly attacked by the various liquids used for the treatment (bleaching bath, acid bath and the like). Also perceptible quantities of fine cellulose fibres are not infrequently forced through the sieve and lost.

The so-called suction cell filters (like the perforated bottoms) certainly permit of very rapid working, but apart from this they have all the disadvantages of the revolving screens. They are above all very suitable for expelling liquid, but as the pulp lies firmly on the filter drum, they do not permit of a uniform and intimate admixture with any liquid, solution, etc., as for example, is the case with the intensive agitation of pulp and liquid used for treatment in any mixing container.

Finally, it has been proposed to provide a bleaching apparatus at the bottom and partly at the sides with perforated filter plates through which more or less fine openings pass. Such filter plates have been employed with success for a very long time in the cellulose industry in the case of stationary pulp and stationary liquid. It has, however, been found that these filter plates do not fulfil their purpose when the cellulose pulp and the liquid for treatment are in motion. When the cellulose pulp is in motion the fine holes passing through the filter plates become clogged with small cellulose bundles which project from the filter plates in the manner of bristles from a brush and retain the cellulose which passes by. Thus, a dense bottom layer is formed above which the remaining cellulose moves with the liquid for the treatment. Quite apart from the undesirable clogging of the filter plates a very unequal product is obtained, as the solid cellulose layer at the bottom is not treated sufficiently with the liquid and part may not be treated at all.

According to the invention the liquid used for the treatment is drawn off through diaphragm plates or layers known per se and forming the bottom or the bottom and the walls of the container, while all losses of cellulose are avoided, the cellulose having first been thoroughly mixed and treated with the liquid.

A rapid and efficient treatment of the cellulose moving with the liquid is obtained by dispensing with the good filtering quality of perforated filter plates with comparatively large openings, and by using diaphragm plates which are more expensive but the employment of which as filtering material has already been proposed in the chemical industry for filtering acids etc. The disadvantages of the revolving screens and suction cell filters are completely avoided, and it is possible to attain in a single working process a perfect mixing of the pulp and liquid, a rapid separation of the said liquid and a reduction to a minimum of the losses of fibre.

A further characteristic feature of the invention resides in the fact that the liquid or other reaction components, such as air or gases, can be supplied to the reaction material through the diaphragm plates or layers, if necessary while the cellulose pulp is circulating, so that they become operative in very fine dispersion over an exceptionally large introduction surface. This particular method of supplying the liquid and the reaction components allows of a very rapid mixing with all the cellulose in the container, so that the duration of the treatment may be shortened and the quality of the product further improved.

The method may be used for every possible manner of treating cellulose, wood pulp, etc., with liquids or with reagents dissolved in liquids.

The treatment of cellulose in a bleaching apparatus arranged according to the invention will be described in the following by way of example with reference to the accompanying drawing.

The bleaching apparatus is shown in Figure 1 in longitudinal section, in Figure 2 in cross-section and in Figure 3 in plan. Above the normal bottom $b$ of the bleaching apparatus $a$ there is a second bottom $c$ which consists of porous diaphragm plates. Any desired portion or even the whole bottom of the container may be made of such porous plates or as a permeable layer. Preferably at least the portion of the bottom at the lowest level will be so constructed. Any desired portion of the walls of the container may likewise be formed as a permeable layer and thus the surface acting as a filter may be considerably increased and the action augmented. The short emptying pipe e extends beyond the porous diaphragm bottom, while a second short pipe d opens above the lowest bottom and serves for the supply and discharge of liquid used for treatment (through branch pipe f) as well as for forcing in gases, for example air (through branch pipe g) or steam (through branch pipe h).

If, for example, the bleaching process is now ended, and the cellulose mass is to be acidified and washed, the used bleaching liquid is first run off through the diaphragm bottom by opening the valve of f, connecting in case of need to a suction pipe line, while the pulp remains on the said bottom. The suction pipe line is then closed and a valve (not shown in the drawing) is opened, which connects the short branch pipe f with the water supply pipe. The water passes through d and the bottom c to the mass of pulp, with which it is intimately mixed by the movement of the propeller i. The wash water is then drawn off in the same way as the bleaching liquid was previously. The branch pipe f is then connected to the acid supply pipe and the pulp is now treated with dilute acid in the same way as it was previously treated with water. After this acid has again been removed, the treatment with water in the manner described is repeated until the pulp has been completely washed, when, by opening the discharge valve e, it is emptied into the pulp pit or is led away for subsequent treatment.

We claim:—

1. A process for treating cellulose, mechanical wood pulp and the like comprising mixing treating fluid with the material and subsequently removing excess liquid by filtration in minute dispersion of the order of that obtainable by passing liquid through a porous diaphragm plate.

2. A process for treating fibrous pulp comprising mixing treating fluid with the pulp and subsequently removing excess liquid by capillary filtration.

3. A process for treating fibrous pulp comprising forming the pulp into a layer, circulating the pulp in the layer, passing a treating liquid into the circulating pulp from a constrained surface of the layer and in minute dispersion of the order of that obtainable by passing liquid through a porous diaphragm plate, and afterwards withdrawing the liquid from the same constrained surface and in the same order of dispersion.

4. Apparatus for treating cellulose, mechanical wood pulp and the like with fluid reagents, comprising a container, a porous diaphragm plate in said container, means for circulating the pulp on one side of said diaphragm and means for admitting and drawing off fluid reagents from the other side of said diaphragm.

5. Apparatus for filtering liquid from fibrous pulp, comprising a container, a porous diaphragm in said container the capillary interstices of which are smaller than the cross-section of the smallest fibres of the pulp to be treated, means for circulating the pulp on one side of said diaphragm, and means for drawing off liquid from the other side of said diaphragm.

WALTER CLAUS.
ERWIN SCHMIDT.